United States Patent [19]
Barthalon

[11] 3,727,715
[45] Apr. 17, 1973

[54] SYSTEM FOR ESTABLISHING A PNEUMATIC CONNECTION BETWEEN AN OBJECT AND A WALL

[76] Inventor: Maurice Barthalon, Allee des Sapins le Petit Vaupereux La Faret, Verrieres le Buisson, France

[22] Filed: Mar. 25, 1971

[21] Appl. No.: 127,962

[30] Foreign Application Priority Data

Apr. 1, 1970 France..............................7011567
Sept. 22, 1970 France..............................7034254

[52] U.S. Cl. ...............................180/118, 104/23 FS
[51] Int. Cl................................................B60v 1/04
[58] Field of Search .........................104/23 FS, 134; 180/115, 117–121, 126–128

[56] References Cited

UNITED STATES PATENTS

| | | | |
|---|---|---|---|
| 3,602,147 | 8/1971 | Hart | 104/23 FS |
| 3,381,627 | 5/1968 | Hart | 104/23 FS |
| 3,081,886 | 3/1963 | Flexman | 104/23 FS |
| 3,575,116 | 4/1971 | Hart | 104/23 FS |
| 3,513,934 | 5/1970 | Crowley | 180/127 |
| 3,420,330 | 1/1969 | Bliss | 180/127 |

*Primary Examiner*—Gerald M. Forlenza
*Assistant Examiner*—D. W. Keen
*Attorney*—Young & Thompson

[57] ABSTRACT

A system for providing a pneumatic connection between an object and a wall which are capable of relative displacement, which comprises a guiding chamber which confines a gas layer at a pressure which is different from the ambient pressure, said chamber being delimited by skirts which are carried by the object and directed towards said wall. At least a part of the skirts is capable of moving with respect to the skirt-carrying object and is positionally controlled relative to this latter. At least one movable skirt is connected mechanically to the movable partition of a variable-pressure pneumatic balancing chamber which is mounted on the object and separate and distinct from the guiding chamber. Pneumatic control means are further provided for adjusting the position of said partition as a function of the distance from the lip of the movable skirt to the wall. Under these conditions, the lips of the skirts can be maintained at a practically constant distance from said wall. The object can be a vehicle and the wall a track provided for said vehicle.

32 Claims, 14 Drawing Figures

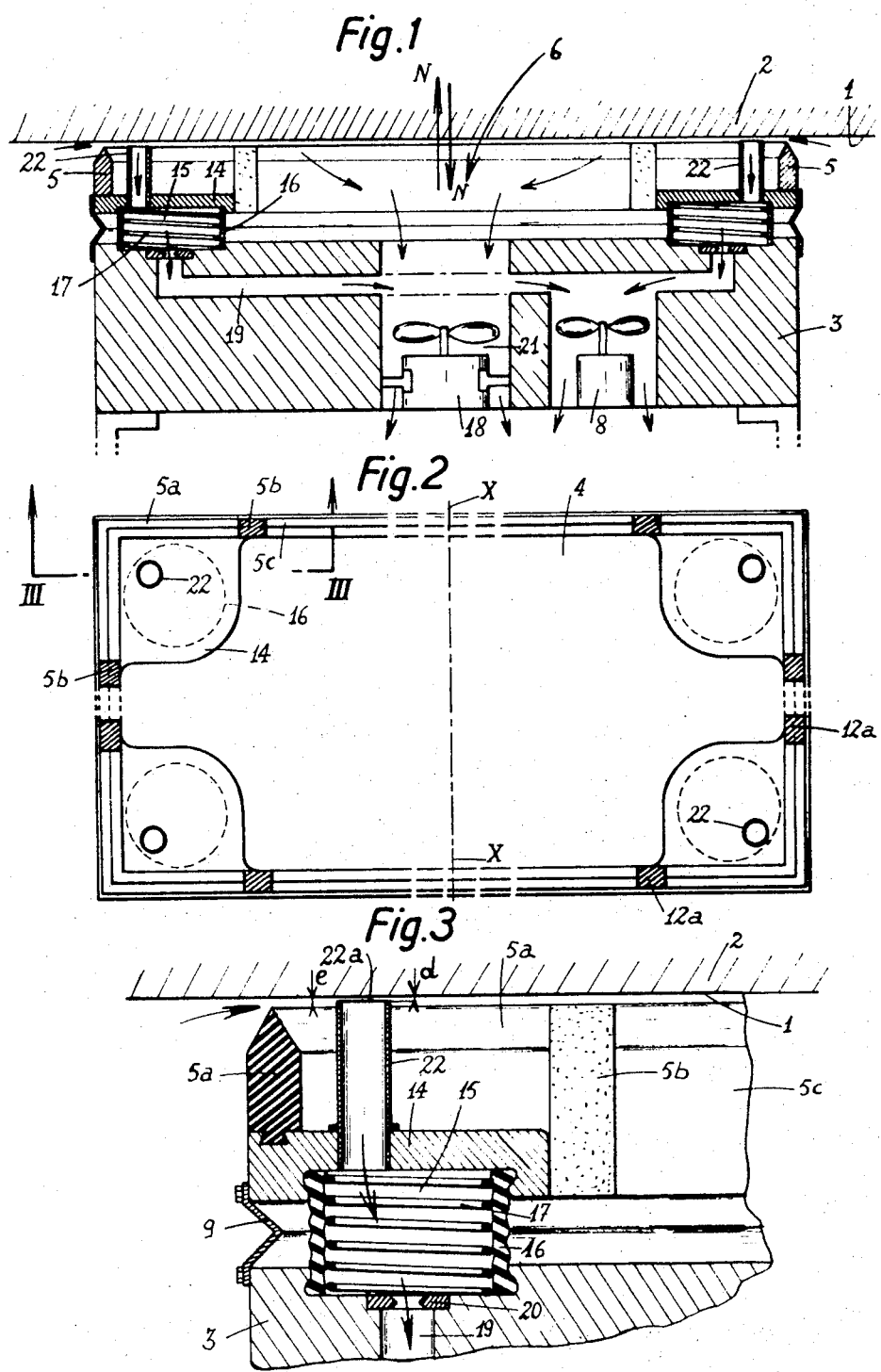

3,727,715

SYSTEM FOR ESTABLISHING A PNEUMATIC CONNECTION BETWEEN AN OBJECT AND A WALL

This invention relates to an improved pneumatic connection system of the type comprising a sucking or blowing fluid layer between an object and a wall which are capable of relative displacement such as a vehicle and its track or its guiding water surface or a shaft and its bearing. By sucking or blowing layer is understood to mean in a general sense a layer resulting from a gas cushion which is maintained at a negative pressure or on the contrary at an excess pressure with respect to atmospheric pressure, said cushion being created between the object and its wall for the purpose of lifting and/or guiding said object.

The connection system which is contemplated by the invention is also of the type comprising so-called containing skirts or any like sealing device for delimiting a sustentation and/or guiding chamber between the object and the oppositely-facing wall.

Provision has already been made for a pneumatic connection system of the type comprising a containing or sealing skirt which is connected to an air cushion vehicle by means of an elastic device in such a manner that the lip of said skirt is permitted to withdraw in the event of contact with the wall of the track. However, even an intermittent contact is sufficient to result in substantial wear which is unacceptable for a means of public transportation.

One improvement in this system has consisted in introducing a systematic lubrication both of the skirt and of the track. However, the system is still not practicable since a high consumption of lubricant is necessary in order to ensure continuous operation. On the other hand, if the system is permitted to come into operation only when the skirt comes into contact with the wall, the necessary action cannot usually be produced in a sufficiently short time on account of the inertia of the system and this latter is consequently ineffective.

These different devices have been improved by providing for pneumatic control of the sealing skirt, the position of which is accordingly governed by the pressure maintained within the sustentation chamber. Said pressure controls the position of a movable face of said chamber to which the sealing skirt is attached. Although this represents an improvement upon previous arrangements, the inertia of the device is still too high since its operation can only be initiated by a substantial pressure variation within either the sustentation chamber or the lipped control chamber or both chambers, the volumes of which are substantial. The complete assembly has thus a reaction time which is too long and a natural frequency which is too low to follow irregularities in profile along the track with an acceptable degree of efficiency and to maintain at a minimum constant value the distance between the sealing skirts of the sustentation chamber and the stationary wall which serves to support or lift the vehicle.

Accordingly, the distance between the skirt and the track has a tendency to vary and to attain values which are either too low and result in repeated contacts and a high degree of wear or else too high and result in the admission of an excessive quantity of air, an increase in the power consumed by the sustentation fans and possible breakaway.

The connection system in accordance with this invention is intended to overcome the disadvantages referred-to above, especially by providing for positional control of the sealing skirts so that these latter are automatically maintained at a substantially constant and predetermined distance from a wall, a track, a ground surface or a liquid surface.

In accordance with the present invention, the system for providing a pneumatic connection between an object and a wall which are capable of relative displacement comprises a guiding chamber which confines a gas layer at a pressure which is different from the ambient pressure, said chamber being delimited by skirts which are carried by the object and directed towards said wall, at least part of said skirts being capable of moving with respect to the skirt-carrying object and positionally controlled relative to this latter. The system is characterized in that at least one movable skirt is connected mechanically to the movable partition of a variable-pressure pneumatic balancing chamber which is mounted on the object and separate and distinct from the guiding chamber, pneumatic control means being further provided for adjusting the position of said partition as a function of the distance from the lip of the movable skirt to the wall. Under these conditions, the lips of the skirts can be maintained at a practically constant distance from said wall.

In this invention, it must be understood that the term "skirt" is used in the general sense of a seal and especially a strip seal although other types may be contemplated.

The term "wall" is also used in a general sense to designate a surface or set of interconnected surfaces. For example, in the case of an object which is capable of moving with respect to a stationary wall, the wall can constitute a track for the object and have specialized walls, one of which serves more especially for guiding the object whilst the other serves to control the rate of air flow to the balancing chamber. In another form of construction, the two guiding and flow-control walls are designed to coincide.

In a preferred embodiment, the pneumatic means for controlling the balancing chamber comprise a nozzle which is carried by the movable partition of the chamber and directed towards the wall and means for producing a flow of air through said nozzle and the chamber in order to bring this latter to a pressure which is different from ambient pressure, said system being further provided with elastic members for producing on the chamber an action which is opposite to the action of the pneumatic control means.

Under these conditions, any relative displacement of the nozzle with respect to the wall results in a variation in pressure within the balancing chamber, thereby causing a displacement of the movable partition of the chamber, said displacement being transmitted to the skirt which is coupled mechanically to said chamber.

According to another characteristic feature of the invention which offers the attraction of simple design and rugged construction, the connection system of the type hereinabove defined is characterized in that the movable partition of the balancing chamber is constituted by a double-walled inflatable and flexible envelope, said envelope being secured to the skirt of the guiding chamber.

Said envelope makes it possible to ensure automatically by conjoint mechanical and pneumatic actions the functions which are assigned to the balancing chamber for positional control of the movable skirt.

Provision is preferably made for at least one nozzle which extends through the double-walled envelope, has its opening in proximity to the lip of the movable skirt and penetrates into the balancing chamber.

In a preferred embodiment, the envelope of the balancing chamber is inflated to a pressure which is higher than that of the guiding chamber and also higher than that of the balancing chamber so that the double wall of said envelope has a biconvex profile. The profile of said envelope is thus made self-stabilizing.

In an advantageous embodiment, the envelope of the balancing chamber has two pneumatic tubular elements which are located on each side of the central plane of said chamber and connected at the top portion thereof to a longitudinal member which supports the skirt.

Moreover, the balancing chamber can advantageously comprise a stationary partition, said partition being rigidly fixed to the object against which the flexible envelope is applied and being provided with at least one orifice for establishing a communication with a power-driven exhaust fan. The stationary partition can especially form part of a negative-pressure air collector which is put into communication with the interior of the envelope.

The flexible and inflatable envelope of the balancing chamber can extend over the entire length of the skirt and be divided into a number of sections placed in end-to-end relation, each section being intended to support a substantially rigid portion of the skirt and the different sections of the chamber and of the skirt being connected together by means of flexible seals. This permits adaptation of the skirt to any irregularities in the profile of the guiding wall.

Preferably, the partition against which the flexible envelope of the balancing chamber is applied is the partition of a collector which is carried by the object and terminates in a power-driven air-exhaust fan, said partition being pierced by suction orifices in spaced relation. When the guiding chamber is at a pressure which is lower than atmospheric pressure and the skirt serves as a separation between two guiding chambers of this type, an advantageous arrangement of the invention consists in inflating the envelope of the balancing chamber to atmospheric pressure, orifices being formed in said envelope in order to establish a communication with the surrounding atmosphere. A reference pressure can thus be very readily maintained within the envelope.

Further properties of the invention will become apparent from the following description, reference being made to the accompanying drawings which any given by way of example without any limitation being implied, and wherein:

FIG. 1 is a transverse sectional view of the upper portion of a vacuum-lift vehicle which is equipped with the connection system in accordance with the invention;

FIG. 2 is an overhead plan view with portions broken away showing the complete connection system of FIG. 1;

FIG. 3 is a sectional view on a larger scale and showing the control chamber, this view being taken along line III—III of FIG. 2;

Figure 4:
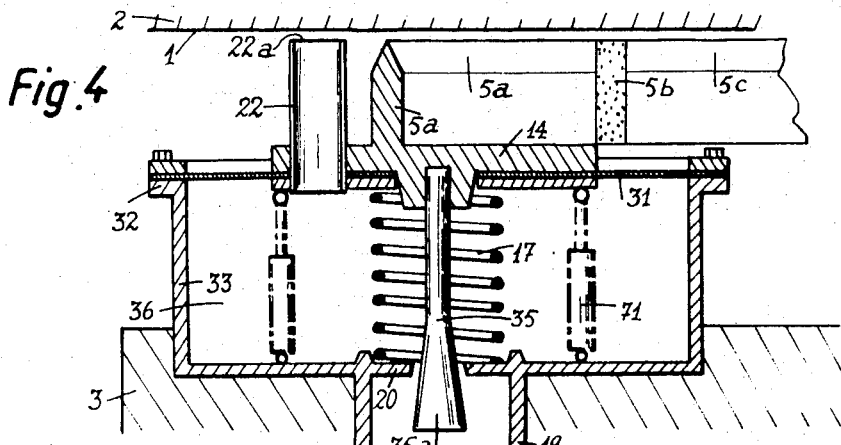
FIG. 4 is a view which is similar to FIG. 3 and shows an alternative form of construction of the control chamber.

In the embodiment of FIGS. 1 to 3, the pneumatic connection system in accordance with the invention is applied to a vehicle of a type which is suspended by means of gas layers which are maintained at a negative pressure relative to the pressure of the surrounding atmosphere, said vehicle being capable of moving beneath the substantially flat and horizontal wall 1 of a track 2 which serves to guide said vehicle and which also constitutes the flow-control wall of the balancing chamber as will become apparent hereinafter.

The superstructure 3 of the vehicle as shown in the drawings is provided at the top portion thereof with at least one carrying and guiding chamber 6 which confines a gas layer at a negative pressure between the wall 1, the top wall 4 of the superstructure 3 and a set of sealing skirts 5 which form a polygon (namely a quadrilateral in the example under consideration), the sides of which are respectively parallel and perpendicular to the axis X—X of displacement of the vehicle in order to obtain a carrying chamber which has a surface area of maximum value.

The chamber 6 is depressurized by means of a blowing machine consisting in this case of a power-driven exhaust fan 18 housed within a well 21 which has its admission opening in the wall 4.

The skirts 5 are constituted by an assembly of rigid right-angle members 5a which are connected by means of deformable coupling members 5b (such as rubber blocks, for example) to longitudinal partitions 5c and the complete assembly is connected to the superstructure 3 by means of a bellows seal 9 which permits displacement of the skirts 5 in the direction N—N at right angles to the track 2.

The right-angle members 5a are carried by the partition 14 (as shown in FIG. 3), said partition being rigid but also capable of moving in the direction N—N and forming part of a pneumatic balancing chamber 15, said chamber being delimited laterally by a deformable bellows-type wall 16 which is fitted within the superstructure 3 and is joined to the partition 14 in leak-tight manner. The wall 16 is held in position by a spring 17 which is applied against the superstructure 3 and against the partition 14 and tends to bring this latter towards the wall 1.

The chamber 15 communicates with a power-driven exhaust fan 8 by means of a duct 19 which is partially closed by a diaphragm 20. The chamber 15 also communicates with the carrying and guiding chamber 6 by means of a nozzle 22 which passes through the partition 14. The distance $d$ between the orifice 22a of the nozzle 22 of the wall 1 is of the same order of magnitude as the spacing $e$ between the lips of the skirts 5 and said wall.

There is thus defined a control cross-secton S which is equal to the product of $d$ and of the perimeter of the orifice of the nozzle 22. The leakage perimeter of the nozzle 22 is smaller than the leakage perimeter of the guiding chamber 6 and is at least smaller than one-half of said perimeter, for example.

As is apparent from FIGS. 1 and 2, a single exhaust fan 8 can serve for a plurality of balancing chambers 15 by means of the branched ducts 19.

The operation is as follows: in the rest condition, the spring 17 applies the orifice 22a of the nozzle 22 against the wall 1. If the exhaust fan 8 is then started up (and correlatively the exhaust fan 18 in order to obtain pneumatic sustentation of the vehicle), a negative pressure is very rapidly created within the chamber 15 and produces action on the partition 14 by applying a downwardly-directed force to this latter, thereby displacing said partition in this direction and compressing the spring 17. The nozzle 22 then moves away from the wall 1, thus permitting the suction of air through the annular passage formed between the orifice 22a of the nozzle 22 and the wall 1. When the orifice 22a is located at a sufficient distance $d$ from the wall 1, the air which is thus admitted into the chamber 15 through the nozzle 22 and passes through the diaphragm 20 automatically limits the value of negative pressure within the chamber 15 to a value such as to balance the elastic reactions which are exerted on the partition wall 14 and in particular the force applied by the controlling spring 17. The diaphragm 20 establishes the distance $d$ of equilibrium as a function of the ratio of its cross-sectional area to the area S which is defined by the orifice 22a. If no provision were made for said diaphragm, the flow circuit between the exhaust fan 8 and the balancing chamber 15 would perform the same function since said circuit can be assimilated with a diaphragm which produces the same pressure drops.

If the distance $d$ has a tendency to increase during the displacement of the vehicle either as a result of a hollow portion in the wall 1 or as a result of a movement of the vehicle away from the track 2, the quantity of air which is admitted into the chamber 15 increases and the value of negative pressure within said chamber decreases, the downward force exerted on the partition 14 decreases and the controlling spring 17 tends to cause the upward motion of said partition as well as the nozzle 22 until this latter again reaches a position of equilibrium at a distance from the wall 1 which is approximately equal to $d$. On the contrary, if the orifice 22a of the nozzle 22 moves towards the wall 1, the negative pressure within the chamber 15 increases, the partition 14 moves downwards and the orifice 22a moves away from the wall 1 until the distance $d$ is substantially restored.

The movements of displacement of the partitions 14 cause correlative movements of displacement of the skirts 5 which are mechanically coupled thereto. The system of pneumatic connection which is provided by the invention thus behaves as a follower system which maintains the distance $e$ between the sealing skirts 5 and the wall 1 at a practically constant value irrespective of the surface irregularities of the track and the movements of the vehicle. The skirts 5 do not come into contact with the track and exhibit zero wear. The system as a whole is particularly simple and can be constructed so as to have a high natural frequency of the order of 20 cycles per second which is wholly suitable in the case of all sucking or blowing air-cushion vehicles which operate at average speeds. A reduction in the distance $e$ between the lips of the skirts 5 and the track 2 relatively to the distance which would be suitable for static skirts permits a gain in sustentation or lifting power which is several times greater than the power consumed by the air flow within the nozzle 22.

A system of this type is also of particular interest in the case of a vehicle in which lifting is carried out by means of gas layers at a negative pressure since the power which is consumed by the system is to be deducted from the power consumed by the lifting propeller.

The arrangement of the four balancing chambers 15 at the four corners of the carrying and guiding chamber 6 as well as the possibility of deformation of the skirts 5 of this latter ensure at each moment that a parallel alignment which is as accurate as possible is maintained between the edges of each skirt and the oppositely-facing wall 1. It is also possible to adapt the characteristics of the controlling spring 17 in order to obtain the desired law of static stability.

In the alternative embodiment of FIG. 4 in which the same elements as those described in the foregoing or elements have practically identical functions are designated by the same reference numerals, the partition 14 is carried by a flexible control diaphragm 31 and this latter is fixed on the flange 32 of a rigid cylindrical wall 33 which delimits the variable-pressure balancing chamber 36. In this example, the nozzle 22 is placed externally of the right-angle members 5a. The suction duct 19 has its opening in the axis of the chamber 36 and is separated from this latter by the diaphragm 20. The balancing chamber 36 comprises means for amplifying the variations in pressure within said chamber. To this end, the cross-section for flow through the diaphragm 20 is controlled by a cylindro-conical pintle 35 which is secured to the underside of the partition 14 and the conical portion 35a of which is partially engaged in the duct 19. The pintle 35 is surrounded by the spring 17 which, as in the previous embodiment, tends to thrust the partition 14 and consequently the diaphragm 31 in the upward direction. It will readily be apparent that sealing means such as flexible walls which are not shown in the drawings are provided for the purpose of ensuring leak-tightness between the bellows seal 9 and the wall of the chamber 36.

The mode of operation of this device is similar to the operation which was described earlier: any movement of the orifice 22a of the nozzle 22 towards the stationary wall 1 results in a decrease in pressure within the chamber 36 and in application of a downward force on the diaphragm 31 which compresses the spring 17 and causes the downward movement of the partition 14. This results in a movement of withdrawal both of the orifice 22a and of the right-angle member 5a relative to the stationary wall 1. However, the pintle 35 causes at the same time an increase in the flow cross-section of the diaphragm 20. This produces an even greater increase in the pressure within the chamber 36, with the result that the distance from the partition 14 and the orifice 22a to the stationary wall 1 increases.

Automatic amplification of the dynamic reactions of the balancing chamber and consequently of the displacements of the partition 14 is thus achieved. The connection system has a reaction speed and a natural frequency which are distinctly higher than the system previously described and can therefore be employed in vehicles which are capable of higher speeds or on a track having surface irregularities of very high frequency.

Figure 5:
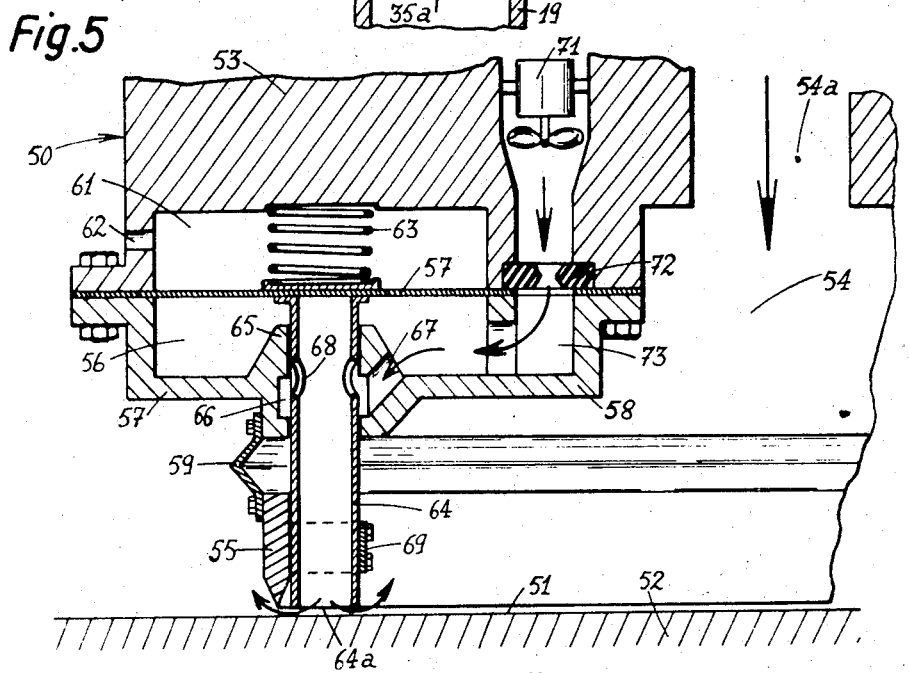
FIG. 5 is a sectional view which is similar to FIG. 3 and shows a connection system for a vehicle which is supported by a blowing-air layer.

In the industrial form of construction of FIG. 5, the pneumatic connection system in accordance with the invention is applied to a vehicle 50 which is supported by air cushions at excess pressure relative to the ambient pressure.

The vehicle 50 is intended to move above the wall 51 of a track 52 which is attached to the ground. The substructure 53 of said vehicle forms a supporting chamber 54 which is supplied with air under pressure through a jet outlet 54a. The chamber 54 is limited at the lower portion thereof by skirts 55 which are disposed in a rectangular configuration, for example, and directed towards the wall 51 of the track 52, said skirts being connected to stationary bearing surfaces by means of deformable bellows seals 59.

The substructure 53 carries the balancing chamber 56 which is maintained at excess pressure relative to the atmosphere in this example, said chamber being delimited by a flexible diaphragm 57 and a fixed casing 58 which serves to secure said diaphragm to the substructure 53. On the side opposite to the chamber 56 is formed a release chamber 61 which communicates with the exterior through a bore 62 and contains a spring 63 which tends to thrust back the diaphragm 57.

A nozzle 64 is fixed along the axis of the diaphragm 57 and slidably mounted within a sleeve 65 of the casing 58, there being formed in said sleeve an annular groove 68 which communicates with the chamber 56 via a passage 67. The nozzle 64 is provided with ports 68 which are capable of penetrating to a greater or lesser extent into the groove 66 according to the position of the diaphragm 57. The nozzle 64 is attached to the skirt 55 by any suitable means such as binding hoops 69. The orifice 64a of the nozzle 64 is located at the level of the lips of the skirts 55.

The balancing chamber 56 is supplied with air under pressure by means of a compressor 71 through a diaphragm 72 and a duct 73 which opens into said chamber.

The operation is as follows: in the rest condition, the spring 63 applies the nozzle 64 against the wall 51. When the compressor 71 is started up, an excess pressure is created within the chamber 56 and produces action on the diaphragm 57, thereby applying an upwardly directed force on said diaphragm which causes the nozzle 64 to slide in this direction while compressing the spring 63. The orifice 64a then moves away from the wall 51 and permits the air to discharge through the annular passage formed between the orifice 64a and the wall 51. When the orifice 64a is located at a sufficient distance d from the wall 51, the air leakage automatically limits the excess pressure within the chamber 56 to a value such as to balance the force of the spring 63.

If the distance d has a tendency to increase during motion of the vehicle either as a result of a depression in the track 52 or as a result of an upward movement of displacement of the vehicle 50, the pressure within the chamber 56 decreases as a result of the increase in leakage at the orifice 64a and the spring 63 thrusts the nozzle 64 downwards together with the skirts 55 which are supported by this latter.

In this embodiment, the ports 68 perform an amplifying function. In fact, if the vehicle 50 and the track 52 move away from each other, there is not only an increase in the annular flow cross-section around the orifice 64a but the ports 68 engage within the groove 66 and the exhaust cross-section of the chamber 56 consequently increases very rapidly. As a result of this phenomenon, the excess pressure which exists within the chamber and is applied to the diaphragm 57 decreases at a faster rate. The nozzle 64 therefore has a tendency to slide more rapidly and the skirts 55 are consequently moved towards the wall 51.

The connection system which has thus been devised is particularly well suited to air cushion vehicles of the excess-pressure type since the power consumption of said system is deductible from the power consumed by the main compressor when the nozzle opens into the air cushion.

Figure 6:
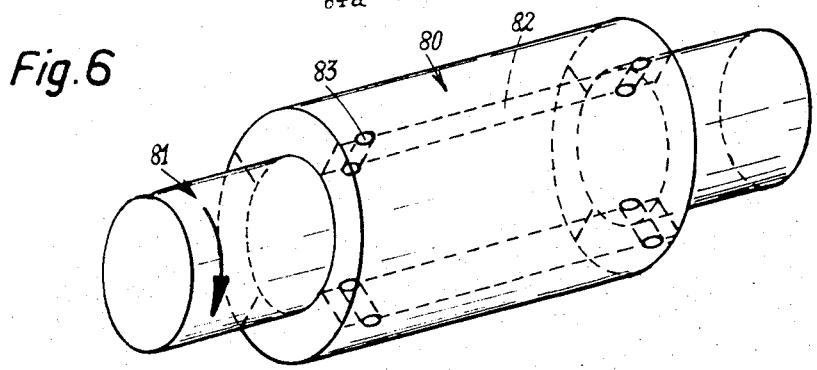
FIG. 6 is a diagram of a fluid bearing equipped with the connection system in accordance with the invention.

In another alternative form which is illustrated in FIG. 6, the invention is applied to fluid bearings 80 for machine-tools, for example, wherein the machine-tool shaft is shown at 81. Longitudinal skirts 82 divide the bearing 80 into a plurality of separate supporting chambers which are disposed in a circle.

The skirts 82 are capable of moving radially with respect to the bearing 80 by virtue of guide means which are not shown in the figure. The skirts 82 are also rigidly fixed to radially movable nozzles 83 forming part of pneumatic connection systems which are of the same type as in FIG. 5 and are therefore not shown in detail. Moreover, each peripheral chamber which is delimited by skirts 82 is supplied with compressed air by distribution means which are not illustrated.

Thus, a practically constant space can be maintained between the shaft 81 and the skirts 82, with the result that guiding of the shaft is ensured with a high degree of precision while ensuring minimum fluid consumption.

Figure 7:
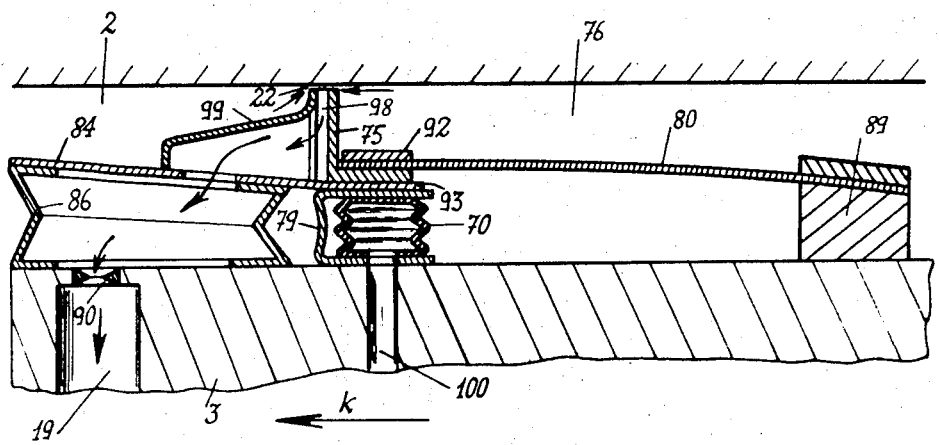
FIG. 7 is a transverse sectional view taken along line VII—VII of FIG. 8 and showing another embodiment of the pneumatic connection system.
Figure 8:
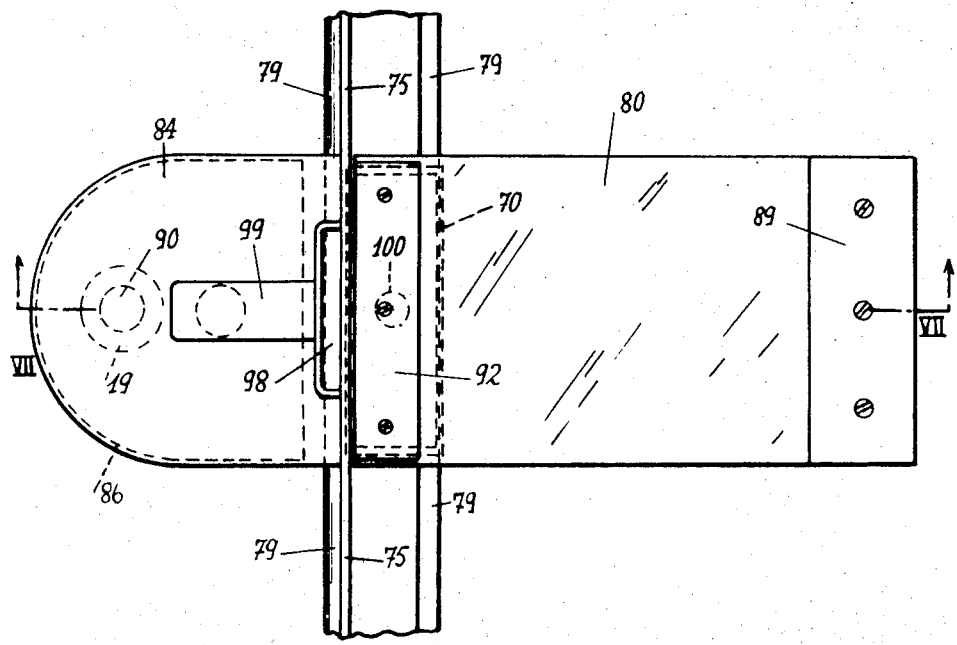
FIG. 8 is the corresponding plan view.

In an alternative embodiment which is illustrated in FIGS. 7 and 8, the device according to the invention is employed for ensuring leak-tightness between the exterior and a sustentation chamber 76 delimited by a rigid sealing lip 75 and a flexible bellows seal 79 which connects said lip to the superstructure 3 of the vehicle which moves relative to the track 2 in the direction K, for example.

The device comprises two or more pneumatic followers which are similar to the device shown in FIGS. 7 and 8 and are located at different points of the lip 75. Each follower essentially comprises a control nozzle 98 which is connected by means of a coupling member 99 to a pneumatic bellows element 86 which is carried by the superstructure 3. The bellows element 86 has a partition 84 which supports the coupling member 99 and is connected to the suction duct 19 by means of the diaphragm 90.

In accordance with a further particular feature of the invention, the lip 75 is supported at the level of the nozzle 98 by means of a resilient strip 80 which is fixed on a block 89; said block is housed within the sustentation chamber 76 and serves to guide and restore said skirt. The other end of the strip 80 is fixed on the plate 93; said plate forms an extension of the wall of the bellows element 86 and serves to support the lip 75. Provision is made beneath the plate 93 for a bellows element 70 which communicates with the atmosphere via a duct 100 and which is housed within the interior of the sustentation chamber 76.

The operation takes place in the same manner as in the previous embodiments but has two additional technical effects and advantages in that the use of the flexible supporting strip 80 eliminates any friction and therefore any hysteresis. Moreover, the bellows element 70 which introduces a pneumatic volume having a differential action makes it possible to eliminate either to a partial or total extent the variations in the clearance 22 of the lip 75 as a function of the load on the vehicle. In fact, when said load increases, for example, the pressure within the guiding chamber 76 decreases whilst the vehicle moves away from the stationary track 2. The elastic restoring force which is exerted by the strip 80 decreases whilst the restoring force which results from the differential action of the bellows seal 79 increases and compensates for the reduction in the elastic restoring force. Under these conditions, the clearance 22 can be maintained substantially constant irrespective of the load by virtue of the pneumatic and mechanical restoring system which has variable flexibility, the stiffness of the pneumatic system being greater than that of the elastic system.

The invention is not limited to the particular cases mentioned above and extends to all combinations of the elements herein described. In particular, it may prove useful in some cases to guide the sealing skirts of a vehicle which is lifted as a result of negative pressure by means of nozzles which are supplied at excess pressure and conversely.

Moreover, it may be useful in some cases and in order to prevent hunting phenomena to add to the spring of the balancing chambers a damping system such as a dashpot as shown diagrammatically at 71 in FIG. 4.

Similarly, the device of FIGS. 7 and 8 is applicable to a sealing lip which forms a separation between two gas layers at different pressures.

Figure 9:
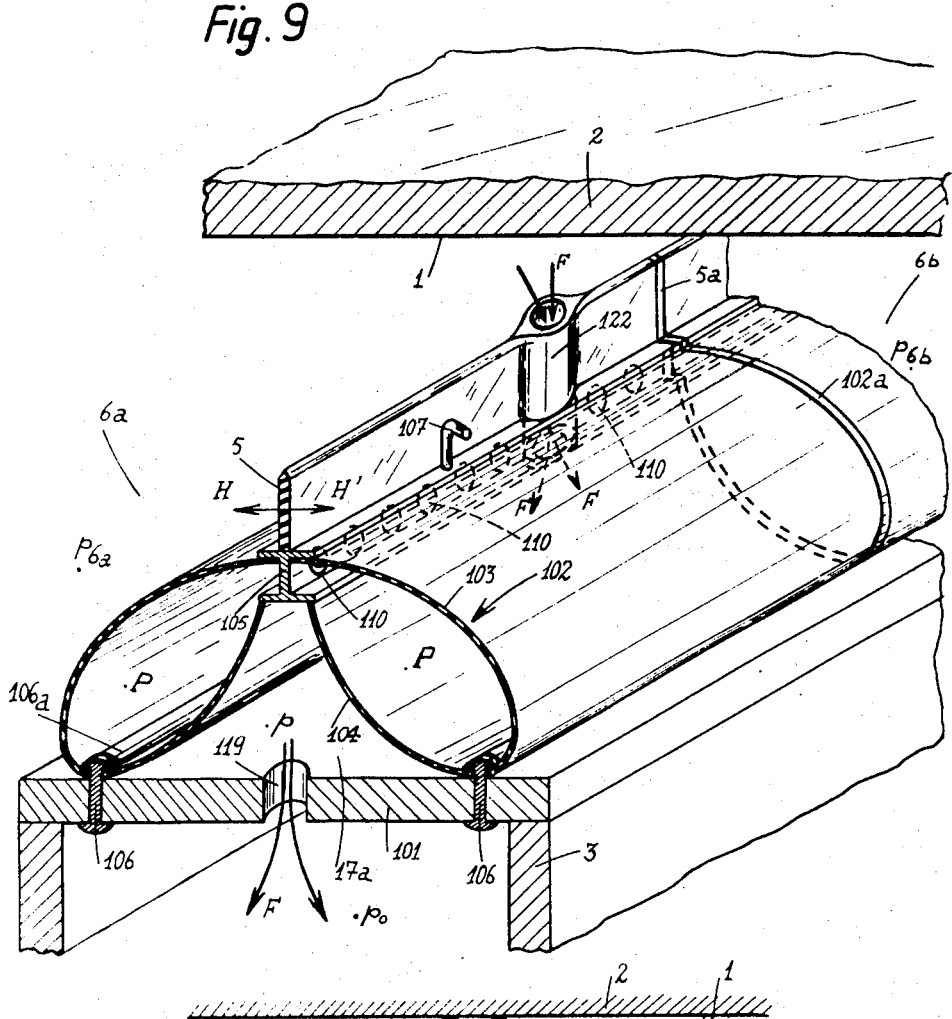
FIG. 9 is a diagrammatic view in perspective and in transverse cross-section showing a simplified embodiment in accordance with the invention.

In the particular embodiment which is illustrated in FIG. 9 of the accompanying drawings, the connection system is applied to a vehicle of the type which is guided by gas layers maintained at a negative pressure with respect to the embient atmospheric pressure. The vehicle is intended to move about the substantially flat and horizontal wall 1 of a track 2 which serves to guide said vehicle and constitutes the flow-control wall of the balancing chamber. In the example under consideration, the sealing skirt which is shown at 5 is a decoupling skirt which serves to provide a separation between two depressurized chambers 6a and 6b and these latter serve to guide the vehicle whose superstructure is shown at 3. Said superstructure forms a stationary partition 101 which extends parallel to the skirt 5.

In accordance with the invention, the balancing chamber 17a comprises a flexible and inflatable envelope 102. The envelope 102 has a double wall, namely an outer wall 103 having an outward convexity and an inner wall 104 whose convexity is directed towards the balancing chamber 17a. In this embodiment, the walls 103 and 104 form part of a single tubular element which extends parallel to the skirt 5 and serves as a support for this latter.

More precisely, the envelope 102 is applied against the stationary partition 101 which thus serves to delimit the balancing chamber 17a. As is apparent from FIG. 9, the two walls 103 and 104 have roughly the shape of an inverted "V" while having curvatures of opposite direction.

The walls 103 and 104 of the envelope 102 are joined together by means of a longitudinal member 105 such as a structural section, the two flanges of which permit the attachment of the material of the envelope 102 which is endowed with flexibility but a low degree of elasticity whilst the web ensures that the extremities of the wall 104 are maintained at a predetermined distance with respect to the wall 103. The envelope 102 is secured to the partition 101 by means of fixing rivets 106 or like means which pass through the partition 101 and are spaced along said envelope so as to compress a strip 106a.

The equipment is completed by nozzles 122 which are arranged at intervals along the lip 5, extend along the web of the longitudinal member 105 and open into the interior of the balancing chamber 17a.

As a complementary feature, the stationary partition 101 is pierced by orifices 119 which serve to establish a communication between the interior of the chamber 17a and a motor-driven exhauster set which is capable of developing within said chamber a pressure $p$ of lower value than the pressure $p_o$ which is maintained on the other side of the partition 101. In accordance with a characteristic feature of the invention, the pressure $p$ is so determined as to be lower than the pressure $p_{6a}$ or $p_{6b}$ which prevails within the adjacent guiding chambers 6a and 6b. As a complementary feature, the envelope 102 is intended to be inflated to a pressure P which is higher than all the pressures mentioned above including the pressure $p_{6a}$ and $p_{6b}$. For example, the pressure P can be equal to atmospheric pressure if the chambers 6a and 6b are maintained at a pressure which is lower than this latter in order to ensure sustentation of the vehicle. In order to inflate the envelope 102, provision is made for at least one valve such as the valve 107 which is arranged at a suitable location.

When the system is in operation and taking into account the value of the pressure P relative to the pressures of the guiding chambers 6a, 6b and of the balancing chamber 17a, the two walls 103 and 104 have a self-stabilizing convex profile and tend to apply the nozzle 122 against the wall 1. At the same time, a circulation of air is established in the direction F between the lip of the skirt 5 and the wall 1 through the nozzle 122 and then through the orifices 119 by reason of the respective values of the pressures $p_o$, $p_{6a}$, $p_{6b}$.

Under these conditions, if the lip of the skirt 5 is substantially applied against the wall 1 of the track 2, the pressure $p$ is reduced to an appreciable extent within the balancing chamber 17a, the curvature of the wall 104 increases, thereby attracting towards the partition 101 the longitudinal member 105 together with the entire envelope 102 and consequently moving the skirt 5 away from the wall 1.

On the contrary, if the lip of the skirt 5 is too distant from the wall 1, the pressure $p$ rises within the chamber 17a and the internal wall 104 expands under the action of the pressure P, with the result that the external wall 103 tends to have a greater degree of curvature in the vicinity of the summit, thereby moving the skirt 5 towards the wall 1.

A further advantage of the invention lies in the fact that the balancing chamber 17 as thus delimited by the flexible envelope 102 restores the skirt 5 to its central position in a transverse direction H or H' when the pressures $p_{6a}$ and $p_{6b}$ become substantially different from each other. This particular feature will be demonstrated within the scope of the embodiment which is described hereinafter with reference to FIGS. 10 to 13.

In this embodiment, the same components as those which appear in the foregoing or components which perform comparable functions are given the same references. However, the flexible and inflatable envelope 202 of the balancing chamber 17a comprises in this example two separate pneumatic tubular elements 203, 204 which have a substantially oval cross-sectional configuration and are inclined in the rest position so as to be substantially symmetrical on each side of the central plane of the chamber 17a. The upper portions of the tubular elements 203, 204 are joined to a longitudinal member 205 having nozzles 222 which are formed at intervals along said member and the orifices of which open opposite to the wall 1.

In this example, the stationary partition 101 which delimits the balancing chamber 17a forms part of a collector 206 which terminates in a power-driven exhaust fan (not shown in the figures). The collector 206 has two longitudinal side-panels 207, 208 and these latter are disposed at right angles to a wall 209 which forms part of the superstructure 3 of the vehicle and on which the collector 206 is mounted. The assembly which is formed by the partition 101 and the side panels 207, 208 thus constitutes a trough in which is placed the envelope 202 whilst the partitions 207 and 208 serve as lateral abutments for the tubular elements 203 and 204.

It is again intended in this case to maintain a pressure $p$ within the chamber 17a which is lower than the pressures $p_{6a}$, $p_{6b}$ of the guiding chambers 6a, 6b which are separated by the skirt 5. The pressure $p$ is also higher than the pressure $p_o$ which is maintained within the collector 206.

The tubular elements 203 and 204 are maintained at a pressure P which is equal to atmospheric pressure and are provided for this purpose with orifices 211, 212 which communicate with ducts 213, 214 and these latter are vented to the atmosphere.

The operation is substantially the same as in the foregoing but is further characterized in that the walls of the tubular elements 203 and 204 are capable of rolling without sliding on the partition 101 and the projecting portions of the side panels 207 and 208, thereby permitting greater ease of vertical and transverse displacement of the skirt 5.

Figure 13:
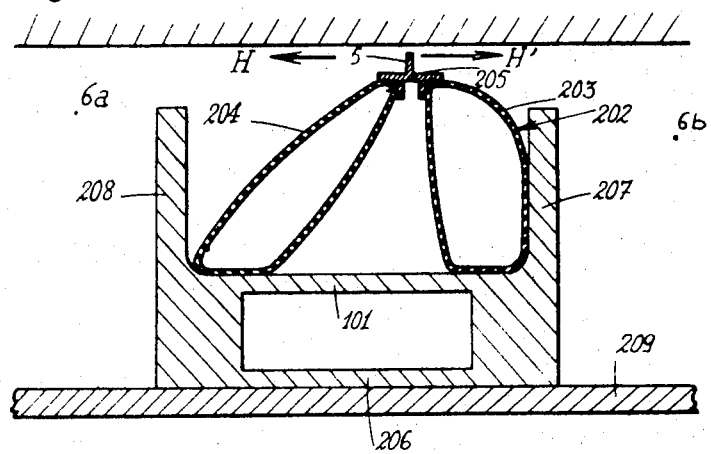
FIG. 13 is a view which is similar to FIG. 12, the skirt being displaced transversely.

In practice, the longitudinal member 205 can be attached to the tubular elements 203, 204 by bonding, the complete assembly being fabricated from plastic material. It is apparent in particular from FIG. 12 that the normal profile of the balancing chamber 17a is particularly simple. Height adjustment of the skirt 5 is the same as in the foregoing. As long as there is little difference between the pressures $p_{6a}$, $p_{6b}$, the skirt 5 is maintained substantially in the plane of symmetry of the trough which is formed by the partition 101 and the side panels 207 and 208. On the contrary, if the pressure within the chamber 6b becomes substantially lower than the pressure which prevails within the chamber 6a, the envelope 202 is deformed as shown in FIG. 13.

The external surfaces of the tubular elements 203 and 204 which are subjected to the pressures $p_{6a}$ and $p_{6b}$ have varied to a very substantial extent ; thus, the active surface of the tubular element 203 has decreased to an appreciable extent whereas the active surface of the tubular element 204 has increased as a result of a displacement which can be assimilated with a rolling movement without sliding of the tubular elements considered on the bearing surfaces 101, 207 and 208. These decreases and increases in active surfaces compensate for the pressure variations, thus tending to thrust the envelope 202 in the direction H opposite to H' with a force which is larger as the skirt 5 has been displaced transversely to a greater extent and as the variations in surface area are more substantial than the variations in pressure. It has in any case been proved by calculation that this phenomenon occurs in actual fact.

In order to permit variable deformations of the skirt 5 through the entire length of this latter both in the vertical direction and in the transverse direction, provision is made in accordance with the invention to divide the balancing chamber 17a, the envelope 102 and the skirt 5 into a number of consecutive sections, said sections being joined to each other by means of flexible seals 5a (as shown in FIG. 9), the envelope 102 being in turn made up of sections which are independent of each other and form separate enclosures.

In accordance with an alternative form of construction which is shown in FIG. 9, the envelope 102 is divided transversely by flexible partitions 102a of sufficient width to permit of deformation by shearing. Under these conditions, the different sections can undergo a relative deformation, taking into account the surface irregularities of the track 2 or the different dynamic conditions which are applicable to the different parts of the vehicle.

It will readily be understood that, in the case in which the envelope 102 consists of two tubular elements, said elements could have a toric cross-sectional configuration while being joined together by means of a common longitudinal member as in the previous embodiment. However, in this case, the vertical and transverse displacements of the skirt 5 would be appreciably reduced with respect to an envelope having a cross-sectional configuration of the type described earlier.

Figure 14:
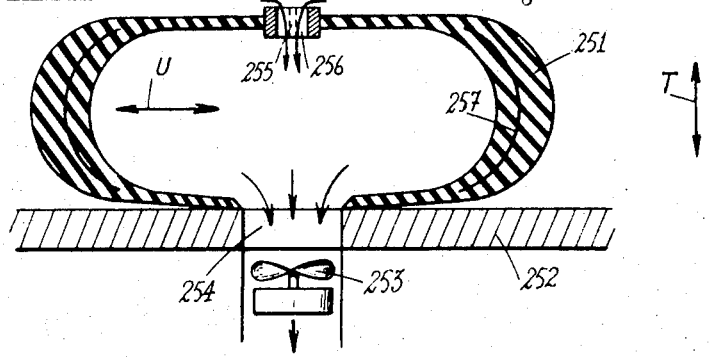
FIG. 14 is a sectional view which is similar to FIG. 10 and shows another embodiment of the movable partition of the balancing chamber.
Figure 10:
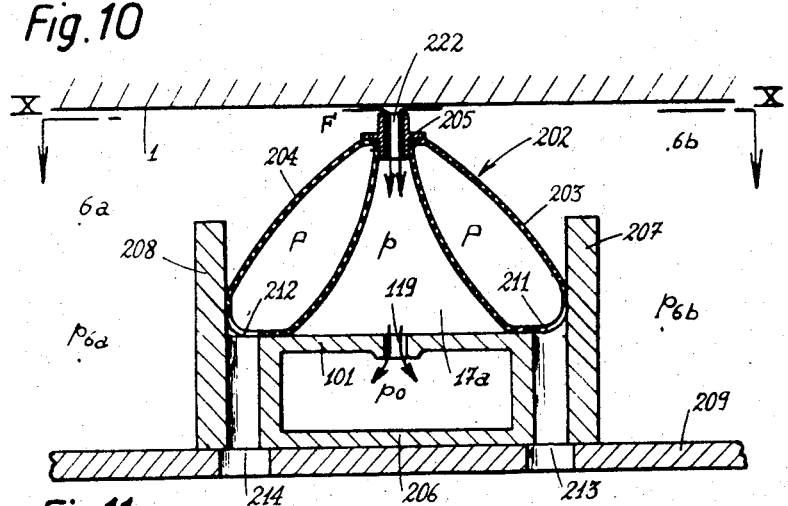
FIG. 10 is a transverse sectional view taken along line X—X of FIG. 11 and showing another improved embodiment.
Figure 11:
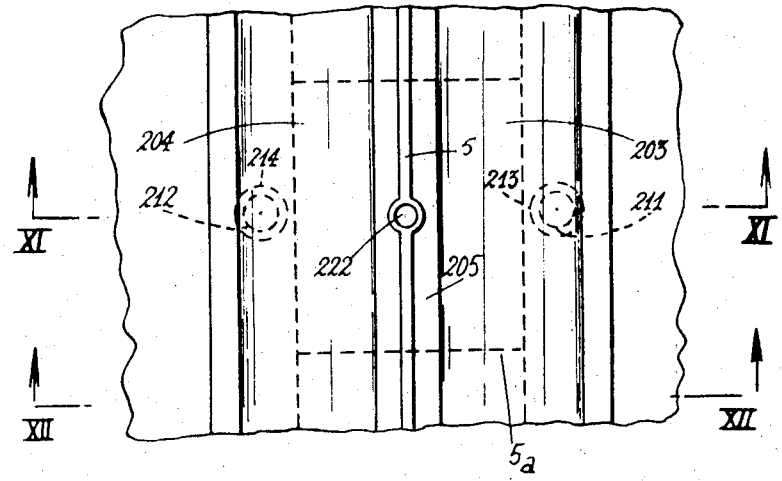
FIG. 11 is the corresponding plan view taken along line XI—XI of FIG. 10.
Figure 12:
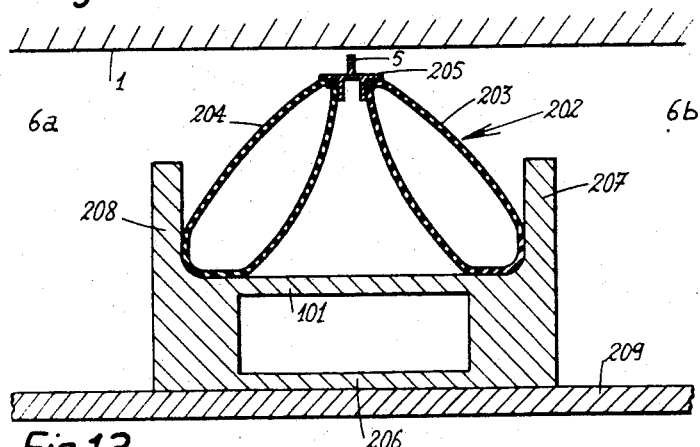
FIG. 12 is a view which is similar to FIG. 10 and taken along line XII—XII of FIG. 11, the skirt being in the central position.

In the embodiment of FIG. 14, the movable partition of the balancing chamber comprises a flexible envelope 251 having a biconvex cross-sectional configuration and formed of either rubber or elastomer. The envelope 251 rests and is fixed on the wall 252 of the vehicle. The envelope is depressurized by means of an exhaust fan 253 which is housed within a duct 254 and this latter opens into the interior of said envelope. On the side opposite to the wall 252, the envelope 251 carries a sealing skirt 255 which cooperates with the wall 1 of the track 2 and orifices 256 extend through said skirt at regular intervals.

The envelope 251 is preferably arranged so as to have variable flexibility at the different points of its transverse cross-section, said flexibility being of a high order in the direction T at right angles to the wall 1 (which corresponds to a displacement of the skirt 255 in a direction parallel to itself) and on the contrary of a low order in the direction U which is parallel to said wall (and corresponds to a transverse displacement of the skirt 255).

This result can be obtained by one or a number of the following means:

the envelope 251 is provided with a greater thickness in the convex lateral portion thereof than in that portion of its surface which is substantially horizontal and parallel to the wall 1;

there is fitted inside the wall of the envelope 251 a strengthening element 257 consisting either of a strip which is elastically deformable in the shape of a T or of a network of interlaced steel wires.

In the rest condition, the elasticity of the envelope 251 has the effect of applying the skirt 255 and the orifices 256 against the wall 1. When the exhaust fan 253 is started up, the negative pressure within the envelope 251 has the effect of flattening this latter, thereby withdrawing the orifices 256 from the wall 1 until the quantity of air introduced into the envelope 251 through the orifices 256 is sufficient to limit said negative pressure. The position of the envelope 251 then corresponds to equilibrium between the action of the ambient pressure on the surface of the envelope and the opposite action of the material of said envelope which may be reinforced by means of the strengthening elements 257.

The structure which is thus provided offers effective opposition to any yielding of the envelope in the direction U while permitting positional control of the skirt 255.

What I claim is:

1. A system for providing a pneumatic connection between an object and a wall, which are capable of relative displacement, said system comprising a guiding chamber which confines a guiding gas layer at a pressure which is different from the ambient pressure, said layer being delimited by skirts which are carried by the object and directed toward said wall, at least part of said skirts being capable of moving with respect to the skirt-carrying object and positionally controlled relatively to said object, means mechanically connecting at least one movable skirt to the movable partition of a variable-pressure balancing chamber which is mounted on the object and separate and distinct from the guiding chamber, a nozzle directed toward said wall and carried by said movable partition, means for producing a flow of air through said balancing chamber and through said nozzle in order to bring said balancing chamber to a pressure which is different from the ambient pressure, and elastic members producing on said movable partition an action which is opposite to the action of the difference between the pressure within said balancing chamber and the ambient pressure, whereby the position of said movable partition is adjusted as a function of the distance from the lip of said movable skirt to said wall.

2. A system in accordance with claim 1, wherein the leakage perimeter between the nozzle and the stationary wall is substantially smaller than the leakage perimeter of the guiding chamber.

3. A system in accordance with claim 1, wherein the leakage perimeter between the nozzle and the stationary wall is smaller by one-half than the leakage perimeter of the carrying air layer.

4. A system in accordance with claim 1, wherein at least one skirt is connected to the object by means of a deformable bellows seal and wherein the skirt is connected mechanically to the nozzle.

5. A system in accordance with claim 1, wherein the balancing chamber is at a pressure which is different from the ambient atmospheric pressure, said chamber being connected to a blowing machine by means of a fluid-circuit provided with a diaphragm.

6. A system in accordance with claim 5, wherein the pressure differences within the guiding layer and within the balancing chamber are in the same direction relatively to atmospheric pressure.

7. A system in accordance with claim 1, wherein the nozzle and the elastic members which produce action on the movable partition have a range of travel such that the nozzle orifice is substantially in contact with the guide track in the rest condition.

8. A system in accordance with claim 1, wherein the nozzle of the balancing chamber is disposed within the carrying and guiding chamber of a guiding air-cushion vehicle.

9. A system in accordance with claim 1, wherein the nozzle orifice which is remote from the movable partition of the balancing chamber has its opening substantially at the level of the lips of the skirts.

10. A system in accordance with claim 1, wherein the nozzle of the balancing chamber is slidably mounted within a sleeve of said chamber and has ports which penetrate into a groove located on the path of the gas stream which passes through the chamber, the flow cross-sectional area of said ports being a function of the position of the nozzle and said ports performing the function of pressure-variation amplifiers.

11. A system in accordance with claim 1, wherein the nozzle and the lip are supported by mechanical restoring means having negligible friction.

12. A system in accordance with claim 1, wherein said system comprises a pneumatic chamber which is separate from the balancing chamber and maintained at a pressure which is different from the guiding chamber, said pneumatic chamber returning the skirt towards the wall.

13. A system in accordance with claim 12, wherein the action of the pneumatic chamber is added to that of the mechanical restoring means and has a stiffness which is greater than that of said means.

14. A system in accordance with claim 12, wherein the pneumatic restoring chamber is housed within the guiding chamber.

15. A system in accordance with claim 1, wherein the movable partition wall of the balancing chamber comprises an inflatable and flexible envelope which is secured to the skirt of the guiding chamber.

16. A system in accordance with claim 15, wherein the envelope has a double wall and at least one nozzle which extends through said wall, said nozzle having its opening in proximity to the lip of the movable skirt and penetrating into the balancing chamber.

17. A system in accordance with claim 15, wherein the envelope of the balancing chamber is inflated to a pressure which is higher than that of the guiding chamber and also higher than that of the balancing chamber so that the double wall of said envelope has a biconvex profile.

18. A system in accordance with claim 15, wherein the balancing chamber comprises a stationary partition rigidly fixed to the object against which the flexible envelope is applied, said partition being pierced by at least one orifice for establishing a communication with a power-driven exhaust fan.

19. A system in accordance with claim 18, wherein the partition against which the flexible envelope of the balancing chamber is applied is the partition of a collector which is carried by the object and terminates in a power-driven air-exhaust fan, said partition being pierced by suction orifices in spaced relation.

20. A system in accordance with claim 15, wherein two side panels forming part of the object extend alongside said envelope in parallel relation thereto, said envelope bearing on said side panels over a variable surface area as a result of elastic deformation which can be assimilated with rolling without sliding motion.

21. A system in accordance with claim 15, wherein the flexible and inflatable envelope of the balancing chamber extends along at least part of the length of the skirt.

22. A system in accordance with claim 21, wherein the balancing chamber is divided into a plurality of sections disposed in end-to-end relation, each section supporting a substantially rigid portion of the skirt and the different sections of the chamber and of the skirt being joined to each other by means of flexible seals.

23. A system in accordance with claim 1, wherein the envelope of the balancing chamber is constituted by a pneumatic tubular element and each wall of said element has a cross-section substantially in the shape of an inverted V, the lower wall being attached to the object.

24. A system in accordance with claim 23, wherein the guiding chamber is at a pressure which is lower than atmospheric pressure and the skirt serves as a separation between two such guiding chambers, wherein the envelope of the balancing chamber is inflated to atmospheric pressure, said envelope having orifices which establish a communication with the atmosphere.

25. A system in accordance with claim 1, wherein the envelope of the balancing chamber comprises two pneumatic tubular elements located on each side of the central plane of said chamber and connected at the top portion thereof to a longitudinal member which supports the skirt.

26. A system in accordance with claim 25, wherein the two tubular elements have substantially oval cross-sections and are inclined on each side of the central plane of the chamber.

27. A system in accordance with claim 25, wherein the longitudinal member which serves to join together the top portions of the two tubular elements has a nozzle which passes through said member and has its opening in proximity to the lip of the movable skirt.

28. A system in accordance with claim 15, wherein the flexible envelope of the balancing chamber has a single wall with a biconvex cross-section and variable flexibility, said envelope carrying the skirt of the guiding chamber.

29. A system in accordance with claim 28, wherein the flexibility of the envelope is greater in the direction corresponding to displacement of the skirt parallel to itself than in the direction corresponding to transverse displacement of said skirt.

30. A system in accordance with claim 28, wherein the envelope is of a material which has elasticity and wherein said envelope has a thickness which is greater in the convex lateral portion thereof than in the portion which carries the skirt.

31. A system in accordance with claim 28, wherein the lateral wall of the envelope is reinforced by means of a flexible strengthening element.

32. A system in accordance with claim 1, wherein the balancing chamber comprises a cylindro-conical pintle which is carried by the movable partition of said balancing chamber and passes through a diaphragm disposed on the path of the gas stream which flows through said balancing chamber, whereby the pressure variations within said balancing chamber are amplified.

* * * * *